Jan. 6, 1942.　　　G. F. RUBLEE　　　2,269,040
STORAGE BATTERY
Filed Dec. 6, 1939　　　2 Sheets-Sheet 1

INVENTOR
George F. Rublee
BY
Pennie, Davis, Marvin & Edmonds
ATTORNEYS

Jan. 6, 1942. G. F. RUBLEE 2,269,040
STORAGE BATTERY
Filed Dec. 6, 1939 2 Sheets-Sheet 2
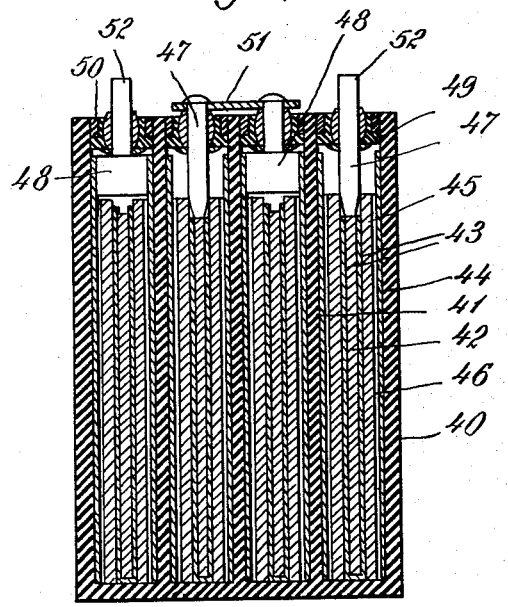
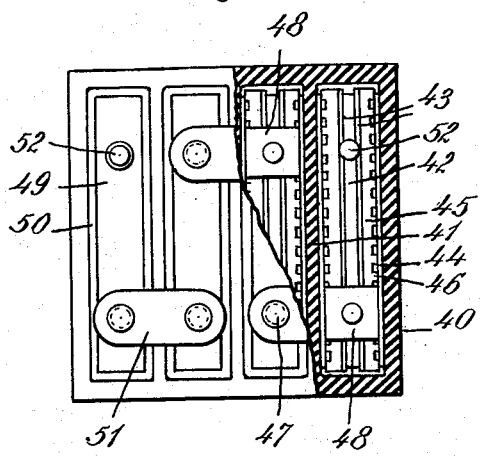
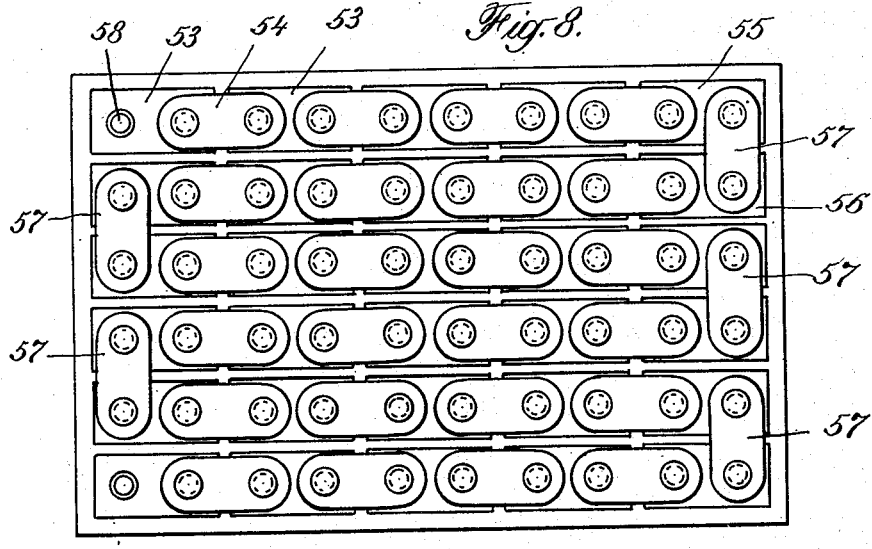
INVENTOR
George F. Rublee
BY
Pennie, Davis, Marvin & Edmonds
ATTORNEYS Patented Jan. 6, 1942

2,269,040

UNITED STATES PATENT OFFICE 2,269,040

STORAGE BATTERY

George F. Rublee, Bridgeport, Conn., assignor to Arthur Slepian, Bridgeport, Conn.

Application December 6, 1939, Serial No. 307,751

3 Claims. (Cl. 136—23)

This invention relates to storage batteries and more particularly to a storage battery in which the formation of gases is reduced to a minimum.

A storage battery which can be manufactured in the small form of a dry cell or dry battery and sealed to prevent spilling or other loss of its contents is highly desirable. The present commercial forms of storage batteries can not be made in this way because of the formation of gas when the battery is idle or under an excessive charge or overcharge. In the ordinary storage battery having positive plates of lead peroxide and negative plates of lead, an excessive charge or overcharge results in the formation of hydrogen gas at the negative plates and oxygen gas at the positive plates.

In the present invention I provide a battery which may be closed by a pitch seal or any of the other types of seals used on the ordinary dry cells and in which the escape of gas is practically eliminated. In constructing the battery of the present invention I employ a lead peroxide positive plate but in place of the negative lead plate now employed I use a metal that is below hydrogen in the electromotive series and will not dissolve in the sulphuric acid electrolyte when the circuit is opened. The metal which I have found best suited for this purpose is copper, although nickel which is slightly above hydrogen in the electromotive series and other metals which are below hydrogen in the electromotive series may also be employed.

According to one theory of operation, in the conventional lead-sulfuric acid battery the positive electrodes consist of lead dioxide and the negative of spongy lead. The electrolyte consists of dilute sulfuric acid. There is then in solution an equilibrium between sulfuric acid molecules and hydrogen and sulfate ions. The lead dioxide, being a strong oxidizing agent, oxidizes the hydrogen to water, with the absorption of electrons from the positive electrode. With no load on the cell an equilibrium is soon established between the electromotive potential of the positive electrode relative to the electrolyte and the oxidizing potential of the dioxide. At this point oxidation ceases.

At the same time, at the negative or spongy lead electrode, the lead reacts with the sulfuric acid to form insoluble lead sulfate. This action proceeds very slowly, due to the fact that the lead sulfate forms a coating over the metallic lead, protecting it from further action. This action releases additional hydrogen ions which replace those oxidized at the positive electrode. As these positively charged hydrogen ions go into solution, the potential of the solution becomes more positive, upsetting the equilibrium of the positive electrode. Further action takes place then at the positive electrode, until a new point of equilibrium is established. Since the action at the negative electrode is independent of that at the positive and is unaffected by that action, an equilibrium at the positive electrode is eventually reached, at the point where the hydrogen ions are at their greatest possible concentration in the electrolyte. From this point on no further action at the positive electrode takes place, providing there is no metallic contact between the positive and negative electrodes. Action does, however, continue slowly at the negative electrode and results in what is commonly termed "sulfation." As this action continues, the hydrogen ions, thus released, remain at the negative electrode since their concentration in the electrolyte is at a maximum, and inasmuch as the negative potential of the spongy lead electrode has been rising. They, therefore, absorb electrons from that electrode and escape as gaseous hydrogen. This explains the formation of gas in an inactive cell of the lead-sulfuric acid type.

When a metallic contact is established between the electrodes, an electronic flow takes place through this contact, from the negative, or spongy lead, electrode to the positive, or lead dioxide, electrode. This electronic flow upsets the equilibrium of the positive electrode, with the result that action at that electrode is resumed. As this action is resumed, the concentration of positive ions in the electrolyte is reduced and thrown out of equilibrium with the negative. The hydrogen ions then, instead of moving to the spongy lead electrode which is now positive relative to the electrolyte, go into solution in an effort to re-establish the electrostatic equilibrium. Thus, no formation of gas takes place during normal discharge.

During charging at normal rates there is no formation of gas due to the fact that the reactions of the discharge cycle are, for all intents and purposes, reversed. When charging at an excessive rate, however, hydrogen is liberated at the negative electrode and oxygen, to a much less extent, at the positive. The reason for this is that at the negative electrode, the lead sulfate molecule must be broken up, allowing the hydrogen to reunite with the sulfate radical for the formation of sulfuric acid, while at the positive electrode the unneutralized valence electrons of the lead atoms are readily available to the valence electrons of the released oxygen atoms for the oxidation from divalent to tetravalent lead.

If the charge is continued past the point where both electrodes have become fully charged, both hydrogen and oxygen are liberated, at the respective electrodes, in the ratio of two to one volumetrically. This is because, with the action complete, no further action is possible and the cell becomes a simple electrolytic gas generator. The cations, being hydrogen, travel to the cathode or spongy lead where they absorb electrons and change to gaseous hydrogen, escaping from the cell. The anions, being sulfate ions, ($SO_4$) travel to the anode where they give up their charge and lose an oxygen atom, becoming sulfur trioxide. This sulfur trioxide, which is sulfuric anhydride, hydrolizes, forming sulfuric acid. The oxygen escapes as gas.

The reactions in the cell of the present invention are of the same character at the lead dioxide electrode as in the conventional cell. Due to the fact, however, that the metal of the negative electrode is below hydrogen in the electromotive series, the solution pressure is too low to force the hydrogen out of solution. There is then, no reaction at the negative electrode of an inactive cell and, there being no liberation of gas at the positive electrode of such a cell, gas formation does not take place.

During the discharge of the cell, the flow of electrons, externally, between the electrodes, lowers the potential of the copper relative to the electrolyte. This drops below the solution pressure of the copper permitting copper atoms to go into solution as ions, two electrons from each atom being retained by the electrode. This action continues as long as there is a difference of potential between the electrodes. When all of the lead dioxide has been reduced to lead monoxide all action ceases. No gas has been formed at either electrode.

On charging the cell of the present invention, the solution pressure of copper being lower than that of hydrogen, the copper ions travel to the copper electrode, absorb the surplus electrons and become metallic copper which then plates on the electrode. As the charge nears completion, the concentration of copper ions in solution would become quite low, with the result that some hydrogen ions would also begin to travel to the copper electrode, causing liberation of gas. To eliminate this I provide a surplus of copper ions. On overcharge, the gas formation at the copper electrode is still eliminated by this surplus of copper ions. At the lead dioxide electrode oxygen is liberated. This reacts with the copper electrode at the surface of the electrolyte, the sulfuric acid acting as a catalyst. The copper oxide then reacts with the sulfuric acid, forming copper sulfate and water. Thus there is no liberation of gas during an overcharge.

In the accompanying drawings I have shown several forms of the invention. In this showing:

Fig. 6 is a vertical, sectional view of a battery comprising a plurality of cells;

Fig. 7 is a plan view of Fig. 6, parts being shown in section; and

Fig. 8 is a plan view of a multi-cell battery.

Figure 1:
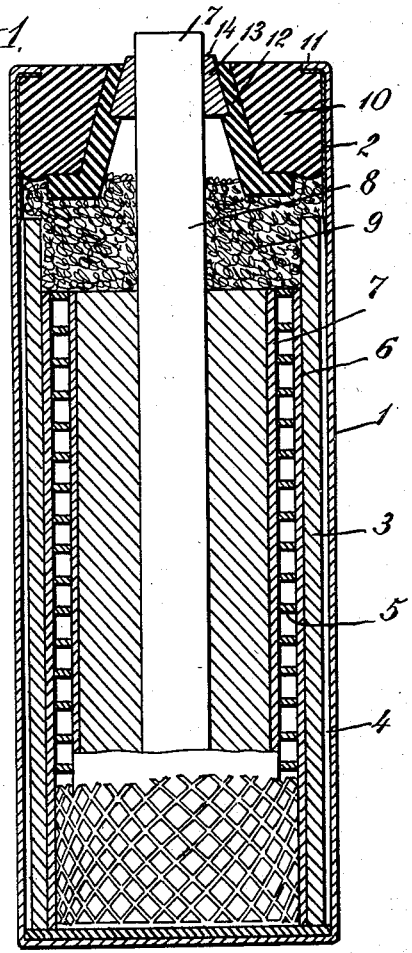
Fig. 1 is a vertical, sectional view of one form of the invention.
Figure 2:
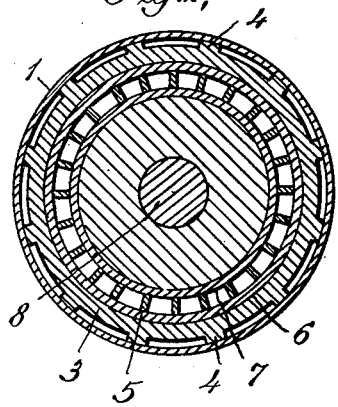
Fig. 2 is a horizontal, sectional view.

Referring to Figs. 1 and 2 of the drawings, the reference numeral 1 designates a copper can, which may be of any suitable shape and form but which is desirably made cylindrical similar to the zinc cans employed in dry cells. The upper portion of the inner surface of this can is provided with an acid-proof enamel coating 2. A separator 3 is arranged in the can, the separator being provided with flutes 4 on its outer surface toward the copper can. The positive plate 5 is in the form of a grid and is preferably cylindrical, the plate consisting of lead or other suitable supporting material coated with lead dioxide. Sheets of blotting paper 6 are arranged on each side of the positive plate and a central lead core 8 is connected to the positive plate 5 and projects from the top of the cell to form a terminal 7. A suitable electrolyte, preferably of sulfuric acid, is arranged in the cell and an air space is provided over the positive plate and filled with glass wool or other suitable filling as indicated at 9. A pitch seal 10 is placed in the top of the can and the upper edge of the can crimped over it as indicated at 11. A hard rubber cap 12 surrounds the upper end of the lead core 8 and is connected thereto by a lead sleeve 13 which is molded in the hard rubber cap. The joint between the lead sleeve and the central terminal is leaded or soldered as at 14.

Figure 3:
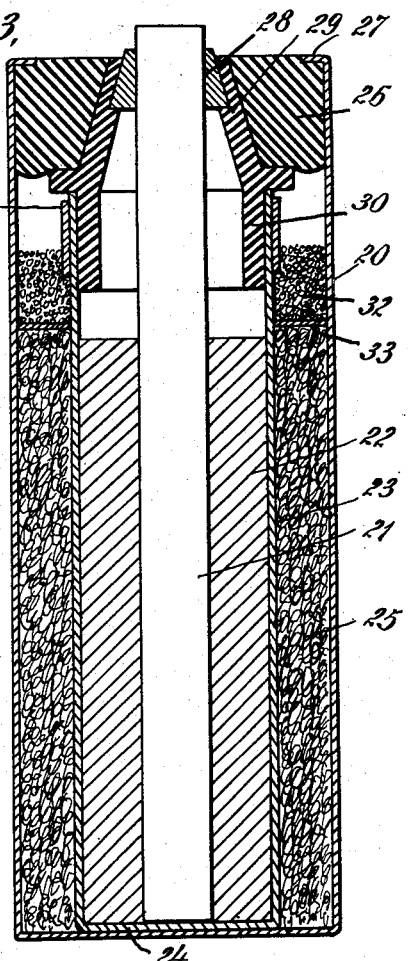
Fig. 3 is a view similar to Fig. 1 illustrating another form of the invention.

In the form of the invention shown in Fig. 3 of the drawings I also employ a copper can 20 which receives a central lead core 21 surrounded by a filling of lead peroxide 22 which forms the positive plate. A sheet of blotting paper 23 is arranged around the lead peroxide filling and extends over the bottom of the can as at 24 to separate the lead peroxide from direct contact with the copper can. The space between the blotting paper and the copper can is provided with a filling 25 of asbestos or rock-wool carrying a suitable electrolyte such as a sulfuric acid solution. A pitch seal 26 is arranged in the top of the can and the upper edge of the can crimped over it as at 27. A lead sleeve 28 surrounds the positive terminal similar to the construction described in connection with Fig. 1 and carries a hard rubber cap 29, generally similar to the hard rubber cap 12. The cap 29, however, is provided with a depending skirt or flange 30 and the upper edge of the blotting paper 23 is secured to it by a suitable clamp 31.

As stated above, some gas may be formed on overcharge of the cell or as the cell reaches full charge and to take up this gas, I provide a catalyst 32 in the copper can over the asbestos or rock-wool 25 which carries the electrolyte. I preferably place a piece of blotting paper, baked clay or other porous material, over the electrolyte as indicated at 33 and arrange the catalyst on it. The catalyst may be charcoal, finely divided nickel, platinum, colloidal palladium or any other catalytic material which will reunite any hydrogen and oxygen produced during gas formation.

Figure 4:
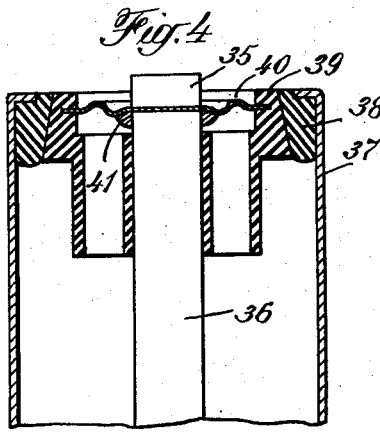
Fig. 4 is a detailed view of the upper portion of a cell showing a terminal arrangement that may be employed in connection with either the cell of Fig. 1 or Fig. 3.
Figure 5:
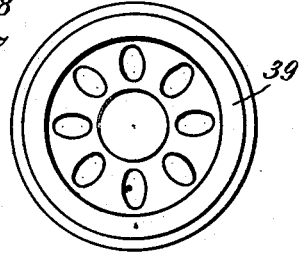
Fig. 5 is a plan view of the cell shown in Fig. 4.

In the form of the invention shown in Fig. 4 of the drawings, I have illustrated a terminal construction which will disconnect the battery during charging upon production of gas. As shown, I provide a terminal 35 which is arranged over, but is separate from the lead core 36 of the battery. The upper end of the copper can 37 is provided with a pitch seal 38 which supports a hard rubber cap 39. A diaphragm 40 is mounted in this cap and the terminal 35 is soldered to it. A gum rubber flexible seal 41 is carried on the under side of the diaphragm and surrounds the upper end of the positive lead core 36. Ordinarily the diaphragm makes electric contact between 35 and 36 so that the battery operates in the usual manner. During charging, however, if gas is produced, the pressure of the gas against the diaphragm separates the members 35 and 36 and thus interrupts the charging. As soon as the gas leaks from the cell through the joints and in other ways, the contact between 35 and 36 is re-established by the diaphragm and the charging is continued.

Referring to Figs. 6 and 7 of the drawings, I have provided a battery preferably rectangular in cross-section similar to the usual storage battery and comprising a plurality of cells. The battery of Figs. 6 and 7 is mounted in a case 40 of hard rubber or other suitable insulating material and is provided with partitions 41 of the same material separating the case into a plurality of cells. Each cell consists of a positive electrode 42, preferably formed of a lead alloy coated with lead dioxide. As in the forms heretofore disclosed the positive electrodes are surrounded by sheets 43 of blotting paper or other similar material. Negative electrodes in the form of copper plates 44 are arranged at each side of each cell and are separated from the positive electrodes by wooden separators 45 having flutes 46, similar to the flutes 4, on the sides of the separators in contact with the negative electrodes. The cells are provided with a filling of a suitable electrolyte in the usual manner. In alternate cells the positive electrodes are provided with a lead terminal member 47 extending through the cover and in the other alternate cells a terminal member 48 is welded to the copper electrodes. The casing of the battery is closed by a cover 49 of hard rubber or other suitable material with a filling of battery pitch 50 between the edges of the cover and the side walls of the casing. The terminals extending through the cover, except for the end terminals are connected to terminals of opposite polarity of the adjacent cell by connectors 51 which are secured to the terminals 47 and 48 by solder or in any other suitable manner. The end terminals 52 extend slightly above the cover to provide suitable means for connection of lead wires. The battery disclosed in Figs. 6 and 7 is of a construction whereby voltages of the range of 6 to 10 volts may be obtained and is for heavier duty than the one cell constructions shown in Figs. 1 to 5.

In Fig. 8 of the drawings I have shown a multicell battery for producing higher voltages, such as 45 volts. The construction of the individual cells of the battery of Fig. 8 is substantially the same as that discussed in connection with Figs. 6 and 7. The battery of Fig. 8 comprises a plurality of individual cells 53 which may be arranged in rows as shown with the terminals of the adjacent cells connected to each other by connectors 54 and the end cell 55 of one row is connected to the adjacent end cell 56 of the next row by a connector 57 extending transversely of the top of the cell. Similar transverse connectors 57 are arranged at each end of each row of cells connecting the adjacent cell of the next row and the two end terminals 58 of the battery are constructed similarly to the terminals 52 of the battery shown in Figs. 6 and 7.

In place of the ordinary sulfuric acid electrolyte, I preferably employ an electrolyte consisting of sulfuric acid containing cupric ammonium sulfate in solution. This provides a surplus of copper ions, and produces a more even plating of copper during the charging cycle. The action of the cupric ammonium sulfate is apparently as follows: The ammonia reacts with the hydrogen which forms at the negative plate, producing ammonium. This ammonium then goes back into solution and ionizes as $H+$ and $NH_3-$. The hydrogen ion remains in solution while the ammonia ion travels to the positive plate, loses its electronic charge, and then returns into solution. This action prevents the hydrogen, which accumulates at the negative plate in small quantities during a heavy charge, from interfering with the smooth deposit of copper.

The electrolyte is preferably made up as follows: To 8.5 grms. of copper sulfate crystals, I add 40 cc. of distilled water and 10 cc. of 26° ammonia. I then add 15 cc. of sulfuric acid of specific gravity 1.84 to 40 cc. of distilled water. As soon as the two solutions have cooled and the copper sulfate has become dissolved, I mix the two solutions.

As set forth, the provision of a cell employing a negative electrode made of a metal that is below hydrogen in the electromotive series results in a construction in which the solution pressure is too low to force hydrogen out of solution on open circuit and which produces negative electrons when it goes into solution upon discharge. A cell of this character has high capacity and long life and can be made in convenient form having all the advantages of a dry cell over the ordinary storage battery, because it is sealed, but upon discharge may be recharged in the same manner as the storage batteries now in use.

I claim:

1. A storage battery comprising a positive electrode formed of an oxide of lead, a negative electrode of copper and an electrolyte comprising cupric ammonium sulfate.

2. A storage battery comprising a copper container forming a negative electrode, a positive electrode formed of an oxide of lead and spaced from the negative electrode, a layer of fibrous material between the electrodes, and an electrolyte comprising cupric ammonium sulfate carried thereby.

3. A storage battery comprising a copper container forming a negative electrode, a positive electrode formed of an oxide of lead and spaced from the negative electrode, a separator between the electrodes, a filling of fibrous material arranged between the electrodes and an electrolyte comprising cupric ammonium sulfate carried thereby.

GEORGE F. RUBLEE.